(12) United States Patent
Leppänen et al.

(10) Patent No.: US 10,540,542 B2
(45) Date of Patent: Jan. 21, 2020

(54) MONITORING

(71) Applicant: NOKIA TECHNOLOGIES OY, Espoo (FI)

(72) Inventors: Jussi Leppänen, Tampere (FI); Antti Eronen, Tampere (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/537,057

(22) PCT Filed: Dec. 18, 2015

(86) PCT No.: PCT/FI2015/050902
§ 371 (c)(1),
(2) Date: Jun. 16, 2017

(87) PCT Pub. No.: WO2016/102759
PCT Pub. Date: Jun. 30, 2016

(65) Prior Publication Data
US 2018/0005024 A1  Jan. 4, 2018

(30) Foreign Application Priority Data

Dec. 24, 2014 (EP) .................... 14200299

(51) Int. Cl.
*G06K 9/00* (2006.01)
*G06F 3/01* (2006.01)
(Continued)

(52) U.S. Cl.
CPC ......... *G06K 9/00335* (2013.01); *G06F 3/017* (2013.01); *G06F 3/0304* (2013.01);
(Continued)

(58) Field of Classification Search
None
See application file for complete search history.

(56) References Cited

U.S. PATENT DOCUMENTS 8,407,057 B2 * 3/2013 Comerford ............. G10L 15/22
704/246
9,487,167 B2 * 11/2016 Graumann ............. G10L 15/22
(Continued)

FOREIGN PATENT DOCUMENTS

| CN | 101216896 A | 7/2008 |
| CN | 102473320 A | 5/2012 |

(Continued)

OTHER PUBLICATIONS

International Search Report & Written Opinion dated Mar. 24, 2016 corresponding to International Patent Application No. PCT/FI2015/050902.
(Continued)

*Primary Examiner* — Soo Jin Park
(74) *Attorney, Agent, or Firm* — Squire Patton Boggs (US) LLP

(57) ABSTRACT

A method comprising: automatically processing recorded first sensor data from a scene to recognise automatically a first user input from user action in the scene; in response to recognition of the first user input, automatically entering a learning state to enable: automatic processing of the first sensor data from the scene to capture an ad-hoc sequence of spatial events in the scene subsequent to the first user input and automatic processing of subsequently recorded second sensor data from the scene different to the first sensor data of the scene, to recognise automatically a sequence of spatial events in the subsequently recorded second video corresponding to the captured sequence of spatial events.

17 Claims, 3 Drawing Sheets

(51) Int. Cl.
*G06F 3/03* (2006.01)
*H04N 5/232* (2006.01)
*G08B 13/196* (2006.01)
*G08B 21/04* (2006.01)

(52) U.S. Cl.
CPC ..... *G06K 9/00718* (2013.01); *G06K 9/00771* (2013.01); *H04N 5/23225* (2013.01); *G06K 2009/00738* (2013.01); *G08B 13/1968* (2013.01); *G08B 13/19615* (2013.01); *G08B 21/0476* (2013.01)

(56) References Cited

U.S. PATENT DOCUMENTS

| | | | |
|---|---|---|---|
| 9,747,898 B2* | 8/2017 | Ng-Thow-Hing | G10L 15/20 |
| 9,753,453 B2* | 9/2017 | Benaim | G05B 19/4183 |
| 2008/0015863 A1 | 1/2008 | Agapi et al. | |
| 2011/0007079 A1 | 1/2011 | Perez et al. | |
| 2011/0157012 A1* | 6/2011 | Ma | G06F 3/017 |
| | | | 345/157 |
| 2012/0019659 A1 | 1/2012 | Warzelhan et al. | |
| 2013/0169801 A1 | 7/2013 | Martin et al. | |
| 2014/0012415 A1 | 1/2014 | Benaim et al. | |
| 2015/0019459 A1* | 1/2015 | Han | G06F 3/04883 |
| | | | 706/11 |
| 2015/0332196 A1* | 11/2015 | Stiller | G06Q 10/06316 |
| | | | 705/2 |

FOREIGN PATENT DOCUMENTS

| | | |
|---|---|---|
| DE | 20 2013 102415 U1 | 9/2014 |
| JP | 2007-316882 A | 12/2007 |
| JP | 2012-533134 A | 12/2012 |
| WO | 2011/008659 A2 | 1/2011 |
| WO | WO 2012/010109 A1 | 1/2012 |

OTHER PUBLICATIONS

Nov. 8, 2017 Office Action issued in European Patent Application No. 14200299.7.
European Office Action dated Jul. 30, 2018, issued in corresponding EP Application No. 14 200 299.7.
Japanese Office Action and it's English language translation dated Aug. 30, 2018, issued in corresponding JP Application No. 2017-533384.
Chinese Office Action corresponding to Appln. No. 201580069677.3, dated May 29, 2019.
Japanese Office Action corresponding to Appln. No. 2017-533384, dated May 29, 2019.
European Office Action corresponding to European Appln. No. 14 200 299.7, dated Aug. 6, 2019.

* cited by examiner

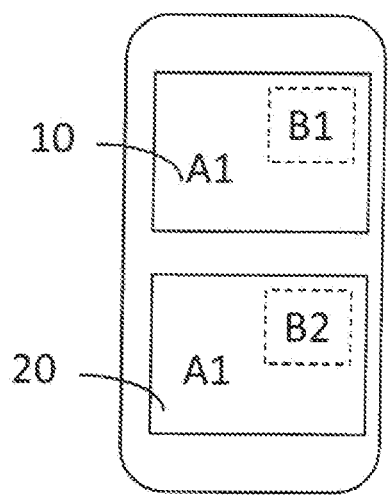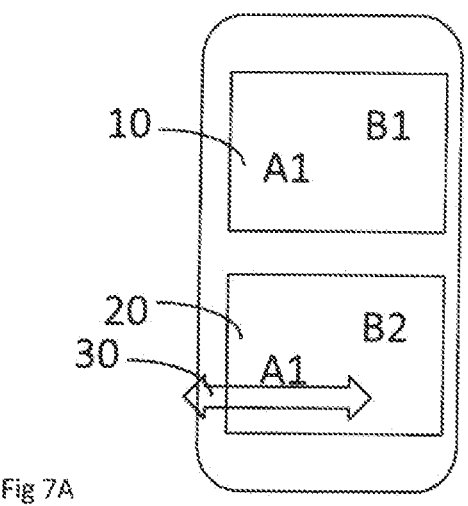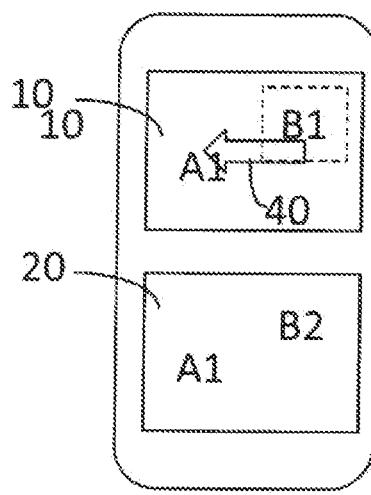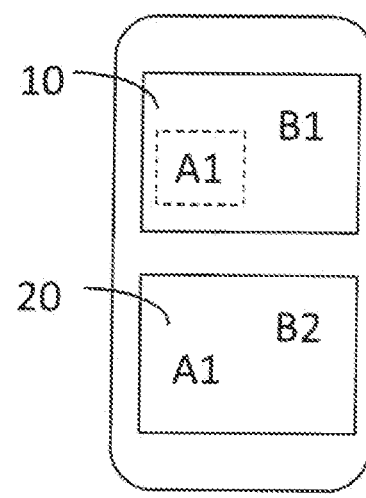
Fig 7A
Fig 7B
Fig 8A
Fig 8B

MONITORING

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene. An operator may, in some examples, be able to use the hub to program settings for the cameras and/or the hub.

BRIEF SUMMARY

According to various, but not necessarily all, embodiments of the invention there is provided a method as claimed in any of claims 1 to 14.

According to various, but not necessarily all, embodiments of the invention there is provided an apparatus as claimed in claim 15.

According to various, but not necessarily all, embodiments of the invention there is provided an apparatus comprising: at least one processor; and at least one memory including computer program code the at least one memory and the computer program code configured to, with the at least one processor, cause the apparatus at least to perform a method as claimed in any of claims 1 to 14.

According to various, but not necessarily all, embodiments of the invention there is provided a computer program that, when run on a computer, performs: a method as claimed in any of claims 1-14.

BRIEF DESCRIPTION

For a better understanding of various examples that are useful for understanding the brief description, reference will now be made by way of example only to the accompanying drawings in which:

FIG. 1 schematically illustrates an example of a system;

FIGS. 7A and 7B illustrate an example of a user interface for controlling creation of a learned response state; and FIGS. 8A and 8B illustrate an example of another user interface for controlling creation of a learned response state;

DETAILED DESCRIPTION

The system 100 described is a system that monitors at least one scene. The operation of the system can be controlled by a user within the scene by carrying out actions within the scene. For example, the user is able to control the system so that the user can act out a behaviour and the system can in the future recognise a similar behaviour.

Figure 1:
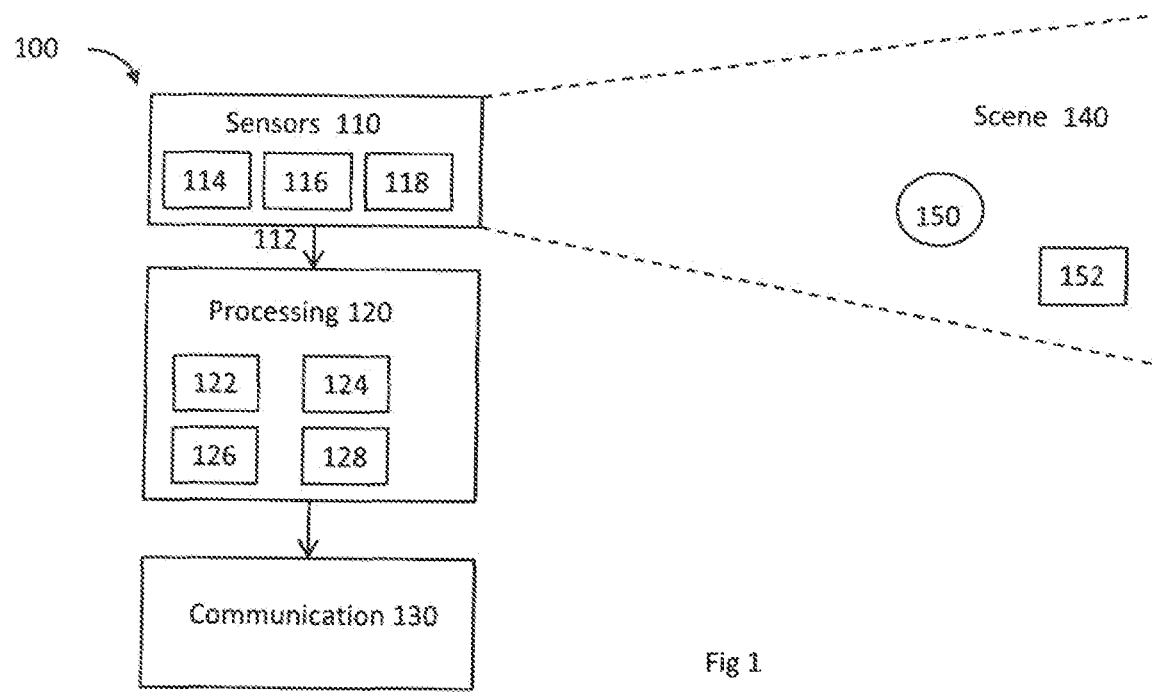

FIG. 1 schematically illustrates a system 100 comprising: one or more sensors 110 configured to record sensor data 112 from a scene 140; a processing module 120 configured to process the sensor data 112 recorded from the scene 140 to recognise automatically events that occur in the scene 140 and to automatically take decisions as a consequence of the recognition; and a communication module 130 configured to communicate, when a decision to communicate is taken by the processing module 120.

Some but not necessarily all of the events that are recognised may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring or other applications. The system 100 may be used in businesses, public areas or at home. One expected use is as a home surveillance system.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording, Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space. In other examples, the sensors 110 are movable or moving relative to the scene space.

In some, but not necessarily all embodiments, the sensors are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement, such as a microphone array, so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receiver (spatial diversity). In one example, the transmitter is configured to 'paint' the scene with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person may carry a positioning apparatus that is configured to position the positioning apparatus within the scene space. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data 110 and/or processed sensor data 110 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:
  use machine (computer) vision to perform one or more of:
    detect a (moving or stationary) object or person,
    classify a (moving or stationary) object or person, and/or
    track a (moving or stationary) object or person;
  use spatial analysis to perform one or more of:
    position a (moving or stationary) object in the scene space using depth determination, and/or
    create a map of the scene space; and/or
  use behaviour analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behaviour.

Object tracking may be achieved by labelling objects and recording the position in the scene 140 of the labelled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The system 100 may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behaviour analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognise a putative symbol encoding an event in the scene 140 as a meaningful symbol associated with a particular meaning.

The recognition sub-module 126 may be configured to recognise a putative symbol, defined in terms of parameters determined from the machine (computer) vision analysis and/or the spatial analysis, and produced by the processing sub-module 124, as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognise meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 128 performs a response action.

In some but not necessarily all examples the action performed may be programmed by a user. In some but not necessarily all examples the programming may occur via motion of the user within the scene. Examples are provided below with reference to FIGS. 5A and 5B. Examples of actions performed may be the generation of an alert or notification.

The alert or notification may be provided via the communications module 130. The communications module 130 may communicate wirelessly, via radio waves or via a wired connection to a local or remote apparatus. Examples of such apparatus include but are not limited to displays, televisions, audio output apparatus, personal devices such as mobile telephone or personal computers, a projector or other user output apparatus.

In some but not necessarily all examples the response symbol may be programmed by a user. For example, as described in further detail below with reference to FIGS. 5A and 5B, a user may be able to program or teach a meaningful event that is represented by a meaningful response symbol. The response symbol, created by the user, may be added to the database of reference symbols or otherwise used to recognise a putative symbol as a meaningful symbol. In some but not necessarily all examples the programming may occur via motion of the user within the scene 140. Examples of meaningful events that are represented by meaningful symbols include particular actions or movements performed such as user input gestures.

b) If the putative symbol is similar to a user control symbol, the meaningful event is a 'user control' event, and the control sub-module 128 enables user control of monitoring and/or user control of the response.

As described in further detail below with reference to FIGS. 5A and 5B, an example of a 'user control' event, is a learning event, that is represented by a learning symbol. Recognition that a putative symbol matches a leaning symbol enables a user to program or teach an a meaningful response event and/or a response action for that response event. Examples of actions performed may be the generation of an alert or notification.

Figure 2:
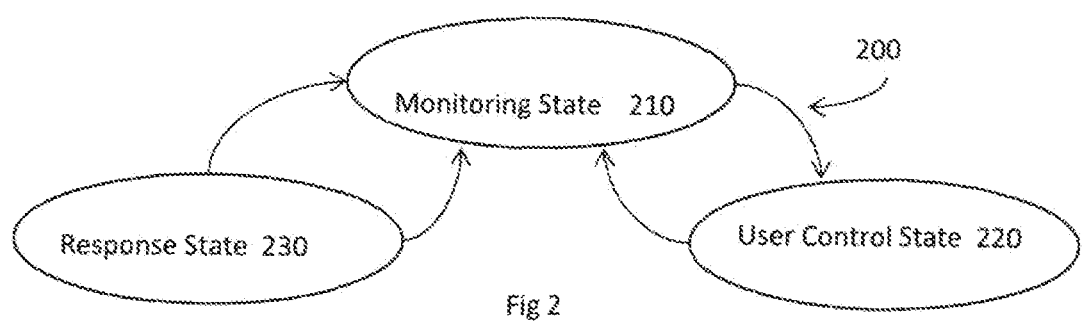
FIG. 2 illustrates an example of a state machine.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 128 responds automatically depending on the event. If the meaningful event is a 'response' event, then the state machine 200 transitions to the response state 230 and the control sub-module 128 performs the response action associated with that response event. If the event is a 'user control' event, then the state machine 200 transitions to the user control state 220 and user control of monitoring and/or response is enabled in a manner associated with that user control state 220.

A particular gesture user input may be used as a 'user control' event. A gesture user input is a gesture that has meaning to the system 100 as a user input. A gesture may be static or moving. A moving gesture may comprise a movement or a movement pattern comprising a series of movements. For example it could be making a circling motion or a side to side motion or an up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors 110. The body part may comprise the user's hand or part of the user's hand such as one or more fingers and thumbs. In other examples, the user input object may comprise a different part of the body of the user such as their head or arm. Three-dimensional movement may comprise motion of the user input object in any three orthogonal directions. The motion may comprise the user input object moving towards or away from the sensors 110 as well as moving in a plane parallel to the sensors or any combination of such motion. A gesture may be a non-contact gesture. A non-contact gesture does not contact the apparatus sensors at any time during the gesture. A gesture may be an absolute gesture that is defined in terms of an absolute displacement from the sensors 110. Such a gesture may be tethered, in that it is performed at a precise location in the scene space. Alternatively a gesture may be a relative gesture that is defined in terms of relative displacement during the gesture. Such a gesture may be untethered, in that it need not be performed at a precise location relative in the scene space and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt. A gesture may be performed in one spatial dimension (1D gesture), two spatial dimensions (2D gesture) or three spatial dimensions (3D gesture).

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

Figure 3:
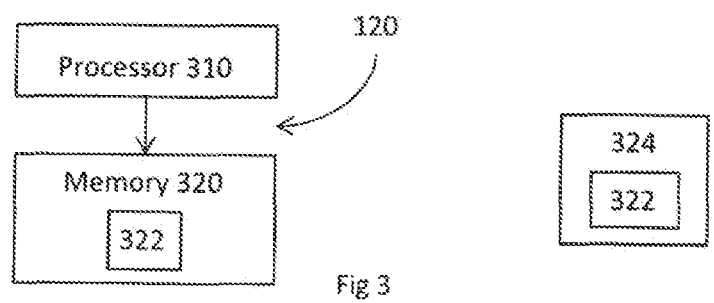
FIG. 3 illustrates an example of a processing module.

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed with reference to FIGS. 1 and 2. The processor 310 by reading the memory 320 is able to load and execute the computer program 322.

The system 100 may therefore comprise an apparatus 120 that comprises: at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1.

Figure 4:
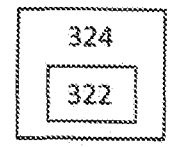
FIG. 4 illustrates an example of a delivery mechanism for a computer program.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

Figure 5A:
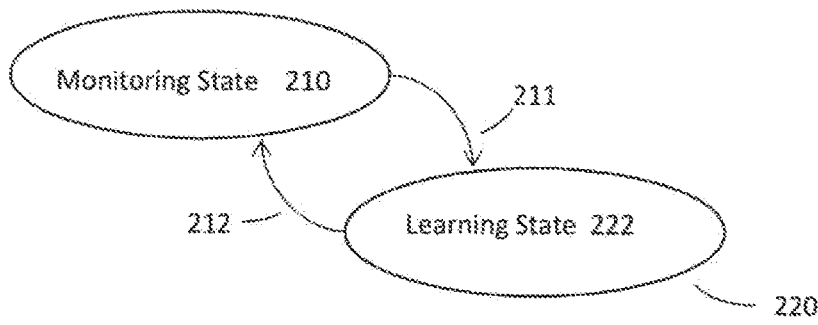
FIG. 5A illustrates an example of a process of creating a new learned response state for a state machine.
Figure 5B:
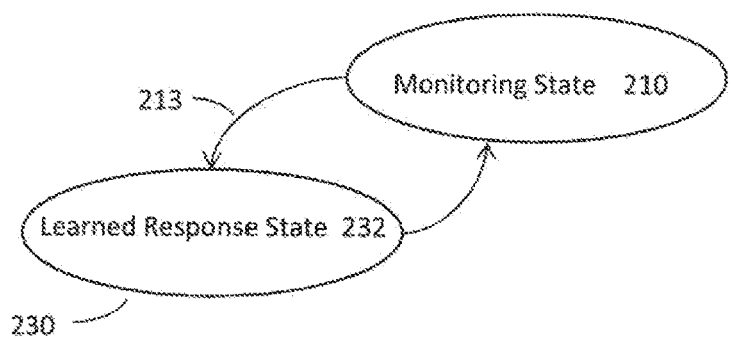
FIG. 5B illustrates an example of a process of transitioning from a monitoring state to the new learned response state and performing an associated learned response action.

FIGS. 5A and 5B illustrate how a state machine 200 as previously described may be programmed by a user, and, in particular by user action within the scene 140. FIG. 5A illustrates the process of using a new user control state 220 (a learning state 222) to create a new response state 230 (a learned response state 232) for the state machine 200. FIG. 5B illustrates the process of transitioning 213 from the monitoring state 210 to the new learned response state 232 and performing an associated learned response action.

As previously described, in the monitoring state 210, the sensors 110 provide sensor data 112, and the processing sub-module 124 automatically processes the sensor data 112 (video and/or audio and/or depth data) to create scene data that has potential meaning. The recognition sub-module 126 automatically processes the scene data to identify actual meaning, that is meaningful symbols, within the scene data.

The meaningful symbols are predetermined, that is, actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140 by recognizing a meaningful symbol, the control sub-module 128 responds automatically depending on the event/symbol.

If the recognition sub-module 126 determines that a learning event has occurred in the scene 140 by recognizing a learning symbol, the control sub-module 128 responds automatically by transitioning 211 to the learning state 222. A feedback indication may be provided to the user such as, for example, an audible or visible confirmation that the learning state 222 has been entered.

In the learning state 222, a user, by performing actions within the scene 140, is able to define a new 'response event' (a learned response event) and a corresponding new response symbol (a learned response symbol) and create a new response state (a learned response state 232) in the state machine 200, as illustrated in FIG. 5B.

In the learning state 222, a user, by performing additional actions within the scene 140, may be able to define the response action (a learned response action) associated with the new learned response state 232.

Referring to FIG. 5B, as previously described, in the monitoring state 210, the sensors 110 provide sensor data 112, and the processing sub-module 124 automatically processes the sensor data 112 (video and/or audio and/or depth data) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140 by recognizing a meaningful symbol, the control sub-module 128 responds automatically depending on the event/symbol.

If the meaningful event is a 'learned response' event, for example, then the state machine 200 transitions 213 to the learned response state 232 and the control sub-module 128 performs the learned response action associated with that learned response state 232. The state machine 200 transitions from the monitoring state 210 to the learned response state 232 when a putative symbol is similar to the newly defined learned response symbol.

Referring back to FIG. 5A, in the monitoring state 210, the sensors 110 provide sensor data 112, and the processing sub-module 124 automatically processes the sensor data 112 (video and/or audio and/or depth data) to create scene data that has potential symbolic meaning. The recognition sub-module 126 automatically processes the scene data to identify a learning symbol, created by a user, within the scene data 112 as a user input command for changing state to the learning state 222.

The learning symbol may, for example be defined using any one or more of video data, audio data and depth data obtained from the sensor data 112.

In some but not necessarily all examples, only video data is used to recognise a learning symbol. In this example, the learning symbol may be, as described previously, a time-evolving, scene independent symbol sequence defined by motion of a tracked user relative to a frame of reference at the tracked user. An example of a learning symbol is a gesture user input.

In some but not necessarily all examples, audio data and/or depth data is used to recognise a learning symbol. In this example, the learning symbol may be a time-evolving, scene independent symbol sequence defined by actions of a tracked user. For example, a depth map may be determined and then a user's changing body position inferred using machine learning. This may be done, for example, at a rate approximately 30 frames per second. The positions of the user's joints are produced as an output and gestures can be defined as a symbol comprising positions of the user's joints. In the case of audio input, an example of a detectable gesture could be a hand clap.

In the learning state 222, the processing sub-module 124 of the processing module 120 automatically processes the recorded sensor data 112 from the scene 140. This involves processing of contemporaneous video data and/or audio data and/or depth data of the scene 140, to capture an ad-hoc sequence of spatial events in the scene subsequent to the recognition of the learning symbol input by the user which causes the transition 211 to the learning state 222.

A 'spatial' event is an event that is, explicitly or implicitly, at least partially defined by its spatial attributes which specify the spatial event. For there to be similarity between spatial events, there must be similarity in the spatial attributes. A spatial attribute may, for example, be defined in relation to a plane, line or point within the scene space. For example, a spatial event may have as a spatial attribute depth as determined by depth data. Depth represents a plane in the scene space. For example, a spatial event may have as a spatial attribute a position within an imaging plane as determined by video data. This position represents a line in the scene space. For example, a spatial event may have as a spatial attribute a bearing as determined by using audio data for beam forming. This bearing represents a line in the scene space. If a spatial event has as spatial attributes depth as determined by depth data and a position within an imaging plane as determined by video data, then the spatial event is a point within the scene space. If a spatial event has as spatial attributes depth as determined by depth data and a bearing as determined by audio data, then the spatial event is a point within the scene space. If a spatial event has as spatial attributes a position within an imaging plane as determined by video data and a bearing as determined by audio data, then the spatial event may be a point or location within the scene space. If a spatial event has as spatial attributes depth as determined by depth data, a position within an imaging plane as determined by video data and a bearing as determined by audio data, then the spatial event is a point or location within the scene space.

The sequence is 'ad-hoc' in that it is not scripted or predetermined.

The ad-hoc sequence of spatial events is used by the processing sub-module 124 to create a new learned response state 232 and to create the learned response symbol for transitioning 213 to that new state 232.

The processing sub-module 124 captures the ad-hoc sequence of spatial events in the scene by analysing recorded sensor data 112. It identifies the ad-hoc sequence of spatial events in the scene subsequent to the learning symbol and stores a symbolic record of the ad-hoc sequence of spatial events to enable subsequent recognition of a sequence of spatial events in recorded sensor data (video data and/or audio data and/or depth data) corresponding to the captured sequence of spatial events.

The ad-hoc sequence of spatial events may comprise a time-evolving, scene dependent symbol sequence relating to an object or location specified by motion of a tracked user. Additionally or alternatively, the ad-hoc sequence of spatial events may comprise a time-evolving, scene dependent symbol sequence relating to an object-user interaction specified by interaction of a tracked user with the object.

For example, a depth map may be determined and then a user's changing body position inferred using machine learning. This may be done, for example, at a rate approximately 30 frames per second. The positions of the user's joints are produced as an output and gestures can be defined as a symbol comprising positions of the user's joints.

Capturing the ad-hoc sequence of spatial events in the scene 140 may, for example, comprise processing the video data, and/or depth data and/or audio data, of the scene 140 to detect a change in the scene 140 other than a change in the user posture or position. The user has, in effect, been discarded from the video so that changes caused by the user rather than changes in the user are detected.

Capturing the ad-hoc sequence of spatial events in the scene 140 may, for example, additionally comprise processing the audio data of the scene 140, in addition to the video data and/or depth data, to detect a signature noise in the scene 140.

The captured ad-hoc sequence of spatial events is used by the processing sub-module 124 to create a new learned response state 232 and to create the learned response symbol for transitioning 213 to that new state 232. It therefore enables automatic processing, during the monitoring state 210, of subsequently recorded sensor data 112 from the scene 140 and the transition 213 to the learned response state 232 when the subsequently recorded sensor data of the scene is automatically recognised as comprising a sequence of spatial events corresponding to the captured sequence of spatial events.

Referring back to FIG. 5B, in the monitoring state, the processing sub-module 124 of the processing module 120 processes subsequently recorded sensor data of the scene, to enable recognition by the recognition sub-module 126 of a sequence of spatial events in the subsequently recorded video corresponding to the captured sequence of spatial events. The recognition sub-module 126 of the processing module 120 processes the subsequently recorded sensor data of the scene to recognise a sequence of spatial events in the subsequently recorded sensor data corresponding to the captured sequence of spatial events.

The sensor data processed by the processing module 120 to enable recognition by the recognition sub-module 126 of a sequence of spatial events in the subsequently recorded spatial data as corresponding to the captured sequence of spatial events, may comprise video data and/or audio data and/or depth data.

The subsequently recorded sensor data of the scene 140 processed by the recognition sub-module 126 of the processing module 120 to recognise a sequence of spatial events in the subsequently recorded sensor data as corresponding to the captured sequence of spatial events, may comprise video data and/or audio data and/or depth data.

The sensor data processed by the processing module 120 to enable recognition may be more comprehensive and come from more sensors than the subsequent sensor data processed by the recognition sub-module 126 to recognise a sequence of spatial events as corresponding to the captured sequence of spatial events. The sensor data processed by the processing module 120 to enable recognition may, for example, comprise depth data and video data whereas the subsequent sensor data processed by the recognition sub-module 126 to recognise a sequence of spatial events as corresponding to the captured sequence of spatial events may, for example, comprise either video data or depth data.

Referring back to FIG. 5A, the transition 212 back from the learning state 222 to the monitoring state 210 may occur in a number of ways. In some examples, it may occur automatically after the user has controlled creation of a new learned response state 232 and the learned response symbol for transitioning 213 to that new state 232 or may occur in response to user action such as an audible event. In other example, it may occur automatically after the user has additionally programmed the learned response action associated with the learned response state 232.

Programming of the learned response action may occur in the learning state 222, by automatically processing, at the processor sub-module 124, the sensor data 112 (video and/or audio and/or depth data) of the scene 140 to enable automatic recognition by the recognition sub-module 126 of a predetermined action symbol associated with a particular learned response action. In response to said recognition, the control sub-module 128 programs the state machine 200 so that the learned response action is performed when the learned response state 232 is entered.

The predetermined action symbol may be a time-evolving, scene independent symbol sequence defined by motion of a tracked user relative to a frame of reference at the tracked user. The predetermined action symbol may be a user input gesture. For example, a depth map may be determined and then a user's changing body position inferred using machine learning. This may be done, for example, at a rate approximately 30 frames per second. The positions of the user's joints are produced as an output and gestures can be defined as a symbol comprising positions of the user's joints.

It will be appreciated from the foregoing that the programming of the learned response event may occur between two predetermined events namely the learning event which causes the transition 211 to the learning state 222 and another predetermined event that causes transition 212 from the learning state 222. It can therefore be assumed that the meaningful event that is to be used as a recognisable learned response event lies between the two predetermined events and processing of the sensor data 1123 to determine the learned response symbol representing the learned response event may be time limited. For example, capturing of the ad-hoc sequence of spatial events in the scene to define the learned response symbol corresponding to the learned response event may occur at a pre-defined temporal relationship to recognition of either one or both of the predetermined events that cause transitions to/from the learning state 222.

Figure 6:
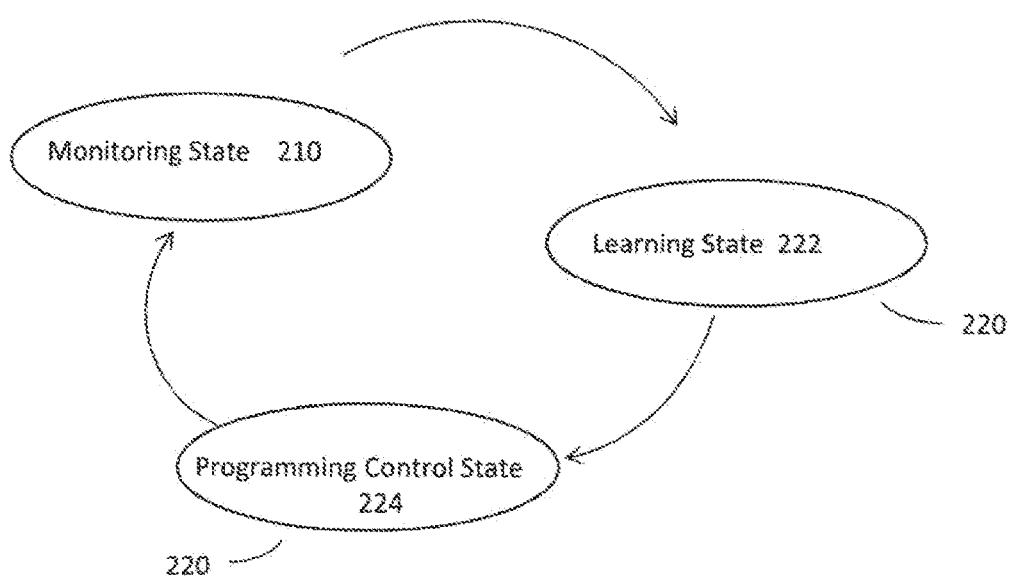
FIG. 6 illustrates a variation to the state machine illustrated in FIG. 5B.

FIG. 6 illustrates a variation to the state machine illustrated in FIG. 5B.

In this state machine 200, the state machine does not transition from the learning state 222 to the monitoring state 210 but instead transitions to another user control state 220, a programming control state 224.

The learning state 222 operates as previously described, however, the learned response state, the learned response symbol and the learned response action are not yet implemented but are putative. The implementation of the putative learned response state 232 (and the learned response symbol and learned response action) do not occur until the transition from the programming control state 224 to the monitoring state 210.

In the programming control state 224, the processing module 120 may perform a disambiguation test before accepting a putative learned response symbol representing a learned response event as a learned response symbol, for subsequent similarity matching against putative symbols during the monitoring state 210.

For example, if the new putative learned response symbol is similar to a pre-existing learned response symbol, then further use of the new putative learned response symbol may be prevented or the user may be requested to repeat the learned response event so that a new learned response symbol can be created.

Alternatively, a disambiguation algorithm, may adapt the putative learned response symbol so that it is dissimilar to the pre-existing learned response symbol and other pre-existing learned response symbols. The adaptation may for example include additional contextual data in the definition of the putative learned response symbol, such as for example, identification of the user, time of day, day of week etc. The disambiguation algorithm may be automatic or it may be under user control. Where it occurs under user control, it may occur as described below.

In the programming control state 224, whether or not a disambiguation test occurs, the processing module 120, may provide an option for user definition of the captured ad-hoc sequence of events that define a learned response symbol.

The user may be shown the video data that includes the 'target video' from which the putative learned response symbol was determined. The target video may be shown within a longer portion of video. The target video may, or may not, identify image features, areas and events that were given importance in defining the putative learned response symbol.

The user may be able to control aspects of the process used to determine the putative learned response symbol, re-process the sensor data and create a new putative learned response symbol.

For example, a user may be able to control the target video so that it starts at a different portion of the video and/or ends at a different portion of the video.

For example, a user may be able to control which image features, areas and events are given importance in defining the putative learned response symbol. The user may, for example, be able to add or remove or edit existing image features, areas and events that are given importance in defining the putative learned response symbol.

If an area is chosen, and the putative learned response symbol is based on audio data, then audio beamforming may be used so that only audio from that area of the scene 140 is used to create the putative learned response symbol.

If an area is chosen, then only sensor data from that area of the scene 140 may be used to create the putative learned response symbol. The sensor data may comprise video data, and/or audio data and/or depth data.

Where audio and/or video and/or depth data are used to create the putative learned response symbol, then the focused areas for audio, for video and for depth may be independently controlled by the user.

The user interface used for this user control may be a user interface on a personal communication device of a user such as, for example, a mobile cellular telephone, personal digital assistant or similar.

FIGS. 7A and 7B illustrate an example of such a user interface. In this example an upper display portion 10 displays the scene 140 before the putative learned response events and the lower display portion displays the target video or a representative still image from the target video during the putative learned response events. The user wants the putative learned response symbol to represent the learned response event when A1 changes to A2. However, the system 100 has selected a putative learned response symbol that represents the learned response event when B1 changes to B2. This selection is indicated in the upper display portion 10 and the lower display portion 20 using indicators (dotted lines). The user controls the putative learned response symbol by touching the part of the lower display portion 20 that displays A1 and scrolls 30 the video by a sideways tracing motion to the event A2. This indicates to the system 100 that a new putative learned response symbol should be determined based on the change of A1 to A2 rather than the change of B1 to B2.

FIGS. 8A and 8B illustrate another example of such a user interface. In this example an upper display portion 10 displays the scene 140 before the putative learned response events and the lower display portion displays the target video or a representative still image from the target video during the putative learned response events. The user wants the putative learned response symbol to represent the learned response event when A1 changes to A2. However, the system 100 has selected a putative learned response symbol that represents the learned response event when B1 changes to B2. This selection is indicated in the upper display portion 10 using a selection indicator (dotted lines). The user controls the putative learned response symbol by touching the part of the upper display portion 20 that displays the selection indicator and using a touch tracing motion 40 to move the indicator to and drop the indicator at A1. This indicates to the system 100 that a new putative learned response symbol should be determined based on a change at A1 rather than the change at B1.

It will therefore be appreciated that a user can control the occurrence in space-time of the capturing of the ad-hoc sequence of events. This may involve controlling the scene space where capturing occurs and/or the scene time within a video sequence when capture occurs.

As an example, a user may be able to confine capturing of the ad-hoc sequence of events to a part or parts of the scene, or extend to the whole scene.

In order to better understand the invention, some examples of how it may be used in a home environment are provided below. However, the invention is not limited to these examples.

The user makes a programming gesture, for example, the user points towards a camera with one hand and then raises an index finger of other hand. Alternatively, the user could clap his hands and this could be analysed and detected from the audio. This starts the learning state 222.

The user carries out a behaviour that he wants programmed for future recognition. For example, the user may open door, switch on lights, adjust heating, open a fridge, go outside the room, enter the room, fall on the floor, sit on the sofa, open or close a cabinet door, wash the dishes, water a flower, start or stop a coffee maker or toaster, put clothes/take away clothes from a washing machine, go to a medicine cabinet, pour water into a glass and drink it, recreate symptoms of a medical condition such as a seizure, etc.

The user makes an end-programming gesture that optionally also programs the learned response action.

For example, the user brings his hand next to his ear as if answering a phone call to indicate that the learned response should be to contact him by phone. As another example, the user brings his hand in front of the user and acts as if type on it to indicate that the learned response should be to contact him by email or text messaging.

This creates a new learned response state 232 for the behaviour and also a learned response action associated with that learned response state.

Later, when a similar behaviour occurs in the same scene 140 or potentially another monitored scene the system 100 automatically performs the learned response action.

A large number of behaviours may be recognised such as for example: open/close window, door or refrigerator; person sitting down, falling down, lying down; going away from a room, entering a room, having a seizure, a person interacting with an appliance such as the coffee maker/toaster/washing machine, pouring water, drinking water, an appliance on (not off); certain sounds such as external noises, dog bark, human noise; lights on/off.

In some examples, the learned response action may be conditional on other parameters and may therefore be delayed. For example, a user may only receive an alert that a window is open or an appliance is on when the user leaves the house. It may be desirable to integrate the system 100 with other systems to provide the additional parameters.

In the foregoing examples, it should be appreciated that the video capture that occurs in the learning state 220 may be in respect of the same scene 140 as the video monitoring that occurs in the monitoring state 210. In fact, the video capture that occurs in the learning state 220 may be the same camera as the video monitoring that occurs in the monitoring state 210.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

It will be appreciated from the foregoing the following example of inventions have been disclosed:

A method comprising: automatically processing recorded first sensor data from a scene to recognise automatically a first user input from user action in the scene; in response to recognition of the first user input, automatically entering a learning state to enable: automatic processing of the first sensor data from the scene, comprising processing of first video of the scene, to capture an ad-hoc sequence of events in the scene subsequent to the first user input, and automatic processing of subsequently recorded second sensor data from the scene, comprising second video of the scene different to the first video of the scene, to recognise automatically a sequence of events in the subsequently recorded second video corresponding to the captured sequence of events.

A method comprising: automatically processing recorded first sensor data from a scene to recognise automatically a first user input from user action in the scene; in response to recognition of the first user input, automatically entering a learning state to enable: automatic processing of the first sensor data from the scene, comprising processing of first depth data of the scene, to capture an ad-hoc sequence of events in the scene subsequent to the first user input, and automatic processing of subsequently recorded second sensor data from the scene, comprising second depth data of the scene different to the first depth data of the scene, to recognise automatically a sequence of events in the subsequently recorded second video corresponding to the captured sequence of events.

A method comprising: automatically processing recorded first sensor data from a scene to recognise automatically a first user input from user action in the scene; in response to recognition of the first user input, automatically entering a learning state to enable: automatic processing of the first sensor data from the scene, comprising processing of first video and/or first depth data of the scene, to capture an ad-hoc sequence of events in the scene subsequent to the first user input, and automatic processing of subsequently recorded second sensor data from the scene, comprising second video and/or second depth data of the scene different to the first video and/or depth data of the scene, to recognise automatically a sequence of events in the subsequently recorded second video and/or depth data corresponding to the captured sequence of events.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    automatically processing recorded first sensor data from a scene to recognise automatically a first user input from user action in the scene;
    in response to recognition of the first user input, automatically entering a learning state to enable:
    automatic processing of the first sensor data from the scene to capture an ad-hoc sequence of spatial events from the scene subsequent to the first user input, and
    automatic processing of the first sensor data from the scene to automatically recognise a second user input from user action in the scene and in response to recognition of the second user input, program a response to recognition that a sequence of spatial events in subsequently recorded second sensor data from the scene, different to the first sensor data of the scene, corresponds to the captured sequence of spatial events,
    automatic processing of the subsequently recorded second sensor data from the scene in a monitoring state to recognise automatically the sequence of spatial events in the subsequently recorded second sensor data corresponding to the captured sequence of spatial events,
    wherein capturing the ad-hoc sequence of spatial events in the scene comprises processing a first video of the scene to detect a change in the scene, and
    wherein processing the first video of the scene to detect a change in the scene excludes detection of a change in a user posture or position.

2. The method as claimed in claim 1, wherein the first sensor data records a gesture user input in the first video.

3. The method as claimed in claim 1, wherein first sensor data from the scene comprises at least the first video of the scene, the method comprising: automatically processing the recorded first video of the scene to recognise automatically the first user input from user movement in the scene.

4. The method as claimed in claim 1, wherein the first sensor data comprises first video and first audio, the method comprising:
    processing the recorded first video of the scene to capture an ad-hoc sequence of video events in the scene subsequent to the first user input;
    processing the recorded first audio of the scene to capture an ad-hoc sequence of audio events in the scene subsequent to the first user input;
    processing of a subsequently recorded second video of the scene, different to the first video of the scene, to recognise a sequence of video events in the subsequently recorded second video corresponding to the captured sequence of video events; and
    processing of a subsequently recorded second audio of the scene, different to the first audio of the scene, to recognise a sequence of audio events in the subsequently recorded second audio corresponding to the captured sequence of audio events.

5. A non-transitory computer-readable medium comprising program instructions for causing an apparatus to perform at least the following:
    automatically processing recorded first sensor data from a scene to recognise automatically a first user input from user action in the scene;
    in response to recognition of the first user input, automatically entering a learning state to enable:
    automatic processing of the first sensor data from the scene to capture an ad-hoc sequence of spatial events from the scene subsequent to the first user input, and
    automatic processing of the first sensor data from the scene to automatically recognise a second user input from user action in the scene and in response to recognition of the second user input, program a response to recognition that a sequence of spatial events in subsequently recorded second sensor data from the scene, different to the first sensor data of the scene, corresponds to the captured sequence of spatial events,
    automatic processing of the subsequently recorded second sensor data from the scene in a monitoring state to recognise automatically the sequence of spatial events in the subsequently recorded second sensor data corresponding to the captured sequence of spatial events,
    wherein capturing the ad-hoc sequence of spatial events in the scene comprises processing a first video of the scene to detect a change in the scene, and
    wherein the processing of the first video of the scene excludes detection of a change in a user posture or position.

6. The non-transitory computer-readable medium according to claim 5, further comprising program instructions for causing the apparatus to perform:
    processing the recorded first video of the scene to capture an ad-hoc sequence of video events in the scene subsequent to the first user input;
    processing the recorded first audio of the scene to capture an ad-hoc sequence of audio events in the scene subsequent to the first user input;
    processing of a subsequently recorded second video of the scene, different to the first video of the scene, to recognise a sequence of video events in the subsequently recorded second video corresponding to the captured sequence of video events; and
    processing of a subsequently recorded second audio of the scene, different to the first audio of the scene, to recognise a sequence of audio events in the subsequently recorded second audio corresponding to the captured sequence of audio events.

7. An apparatus, comprising:
    at least one processor; and
    at least one memory including computer program code;
    the at least one memory and the computer program code being configured to, with the at least one processor, cause the apparatus at least to perform:

automatically processing recorded first sensor data from a scene to recognise automatically a first user input from user action in the scene;

in response to recognition of the first user input, automatically entering a learning state to enable:

automatic processing of the first sensor data from the scene to capture an ad-hoc sequence of spatial events from the scene subsequent to the first user input, and automatic processing of the first sensor data from the scene to automatically recognise a second user input from user action in the scene and in response to recognition of the second user input, program a response to recognition that a sequence of spatial events in subsequently recorded second sensor data from the scene, different to the first sensor data of the scene, corresponds to the captured sequence of spatial events, automatic processing of the subsequently recorded second sensor data from the scene in a monitoring state to recognise automatically the sequence of spatial events in the subsequently recorded second sensor data corresponding to the captured sequence of spatial events, wherein capturing the ad-hoc sequence of spatial events in the scene comprises processing a first video of the scene to detect a change in the scene, and wherein processing the first video of the scene excludes detection of a change in a user posture or position.

8. The apparatus according to claim 7, wherein the first user input is a time-evolving, scene independent sequence defined by motion of a tracked user relative to a frame of reference at the tracked user.

9. The apparatus according to claim 7, wherein said at least one memory and computer program code are further configured to, with the at least one processor, cause the apparatus to further perform:

analysis of recorded sensor data to capture an ad-hoc sequence of spatial events in the scene subsequent to the first user input by identifying an ad-hoc sequence of spatial events in the scene subsequent to the first user input; and storing a symbolic record of the ad-hoc sequence of spatial events to enable subsequent recognition of a sequence of spatial events in recorded sensor data corresponding to the captured sequence of spatial events.

10. The apparatus according to claim 7, wherein the second predetermined user input is a time-evolving, scene independent symbol sequence defined by motion of a tracked user relative to a frame of reference at the tracked user.

11. The apparatus according to claim 7, wherein said at least one memory and computer program code are further configured to, with the at least one processor, cause the apparatus to further perform capturing the ad-hoc sequence of spatial events in the scene, at a pre-defined temporal relationship to recognition of a second predetermined user input.

12. The apparatus according to claim 7, wherein said at least one memory and computer program code are further configured to, with the at least one processor, cause the apparatus to further perform, in a monitoring state, recording the second sensor data of the scene; and processing the recorded second sensor data of the scene to recognise a sequence of spatial events in the recorded second sensor data corresponding to the captured sequence of spatial events.

13. The apparatus according to claim 7, wherein said at least one memory and computer program code are further configured to, with the at least one processor, cause the apparatus to further perform providing an option for user definition of the captured ad-hoc sequence of spatial events.

14. The apparatus according to claim 7, wherein said at least one memory and computer program code are further configured to, with the at least one processor, cause the apparatus to further perform:

providing an option for user definition of a consequence of recognising automatically a sequence of spatial events in a subsequently recorded second video corresponding to the captured sequence of spatial events.

15. The apparatus according to claim 7, wherein said at least one memory and computer program code are further configured to, with the at least one processor, cause the apparatus to further perform:

processing the recorded first video of the scene to capture an ad-hoc sequence of video events in the scene subsequent to the first user input;

processing the recorded first audio of the scene to capture an ad-hoc sequence of audio events in the scene subsequent to the first user input;

processing of a subsequently recorded second video of the scene, different to the first video of the scene, to recognise a sequence of video events in the subsequently recorded second video corresponding to the captured sequence of video events; and processing of a subsequently recorded second audio of the scene, different to the first audio of the scene, to recognise a sequence of audio events in the subsequently recorded second audio corresponding to the captured sequence of audio events.

16. The apparatus according to claim 7, wherein the first sensor data records a gesture user input in the first video.

17. The apparatus according to claim 7, wherein first sensor data from the scene comprises at least the first video of the scene, and wherein said at least one memory and computer program code are further configured to, with the at least one processor, cause the apparatus to further perform:

automatically processing the recorded first video of the scene to recognise automatically the first user input from user movement in the scene.

* * * * *